United States Patent

Uchiyama

[11] Patent Number: 5,822,030
[45] Date of Patent: Oct. 13, 1998

[54] LIQUID CRYSTAL DISPLAY DEVICE, ITS MOUNTING STRUCTURE AND ELECTRONIC DEVICE

[75] Inventor: Kenji Uchiyama, Suwa, Japan

[73] Assignee: Seiko Epson Corporation, Tokyo, Japan

[21] Appl. No.: 648,039

[22] PCT Filed: Sep. 14, 1995

[86] PCT No.: PCT/JP95/01834

§ 371 Date: Sep. 13, 1996

§ 102(e) Date: Sep. 13, 1996

[87] PCT Pub. No.: WO96/08746

PCT Pub. Date: Mar. 21, 1996

[30] Foreign Application Priority Data

Sep. 16, 1994  [JP]  Japan ................................ 6-222058

[51] Int. Cl.⁶ .................................................. G02F 1/1345
[52] U.S. Cl. .......................................... 349/149; 151/152
[58] Field of Search ...................................... 349/149–152

[56] References Cited

U.S. PATENT DOCUMENTS

| | | | |
|---|---|---|---|
| 3,863,436 | 2/1975 | Schwarzchild et al. | 349/149 |
| 4,640,581 | 2/1987 | Nakanowatari et al. | 349/150 |
| 4,690,510 | 9/1987 | Takamatsu et al. | 349/150 |

FOREIGN PATENT DOCUMENTS

| | | |
|---|---|---|
| 2-264222 | 10/1990 | Japan . |
| 3-98020 | 4/1991 | Japan . |
| 0508137 | 10/1992 | Japan . |
| 3-287123 | 12/1992 | Japan . |
| 6-18911 | 1/1994 | Japan . |
| 6-118428 | 4/1994 | Japan . |
| 7-72494 | 3/1995 | Japan . |

Primary Examiner—William L. Sikes
Assistant Examiner—Julie Ngo
Attorney, Agent, or Firm—Mark P. Watson

[57] ABSTRACT

Liquid crystal display device wherein, in addition to the semiconductor chip for liquid crystal drive, a liquid crystal drive circuit or all or some of the other electronic components required for the liquid crystal display control circuit are mounted on one circuit board made from regular hard substrate materials, and the output terminals of said circuit board are connected directly to the liquid crystal cell using an anisotropic conductive film or other known means. The input terminals of the circuit board are connected directly to the terminals of the main unit substrate of the electronic device wherein the liquid crystal display device is installed via a flexible cable, a rubber connector made from conductive rubber or an anisotropic conductive film, or by solder or adhesive. The liquid crystal display device can be secured in place by sandwiching it between the case of the electronic device and the main unit substrate attached to it, in which case the rubber connector between the input terminals of the circuit board and the terminals of the main unit substrate is retained in a compressed state.

26 Claims, 12 Drawing Sheets

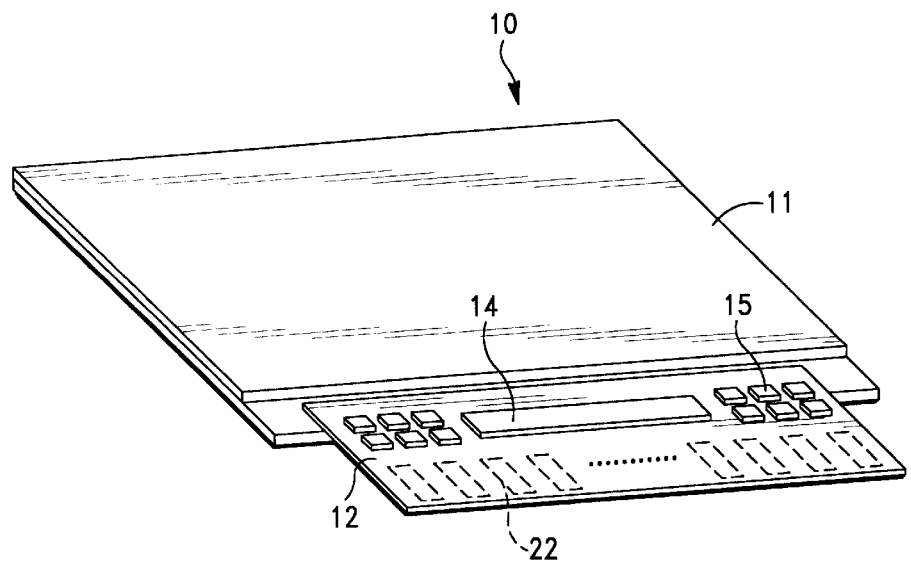
FIG.—5
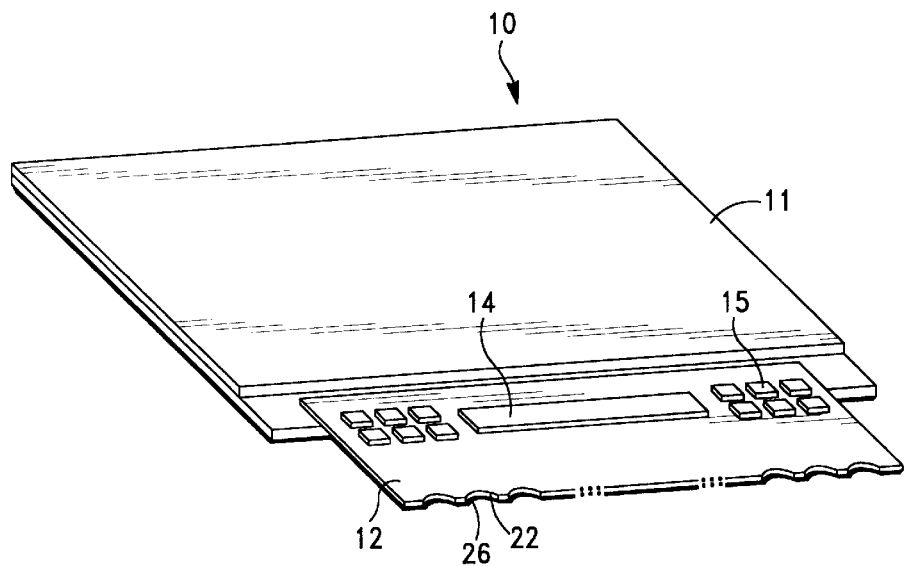
FIG.—6

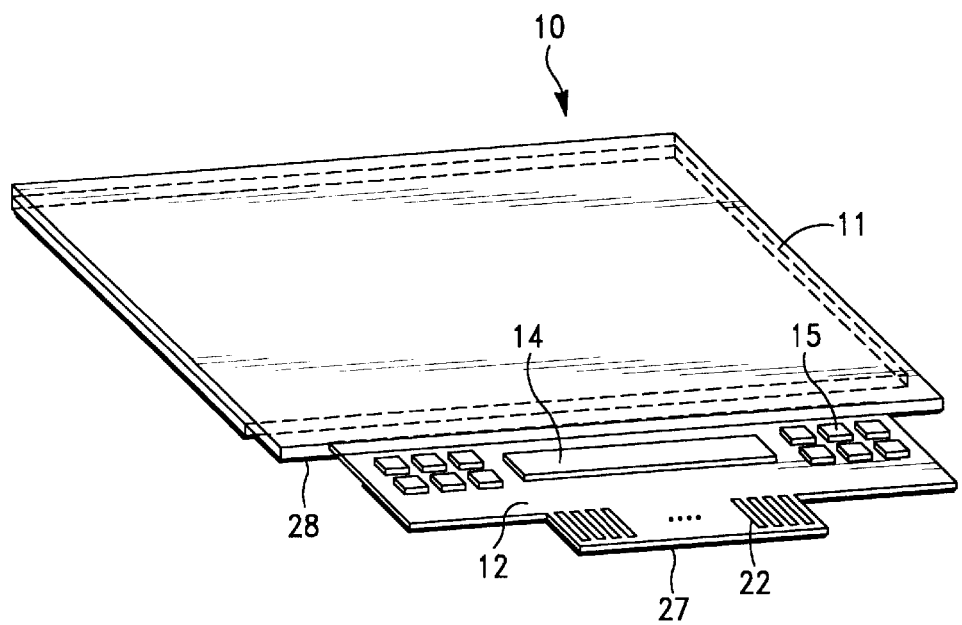
FIG.—9
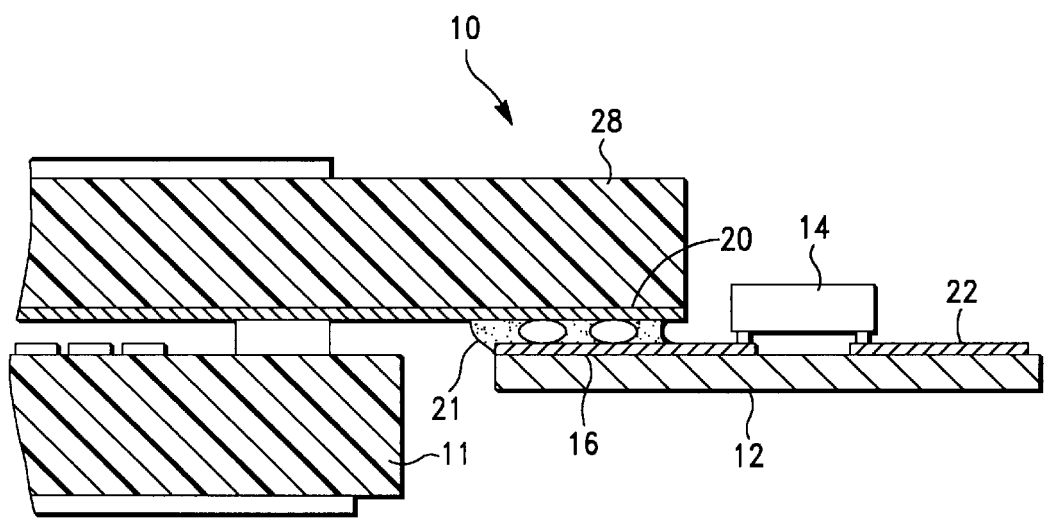
FIG.—10

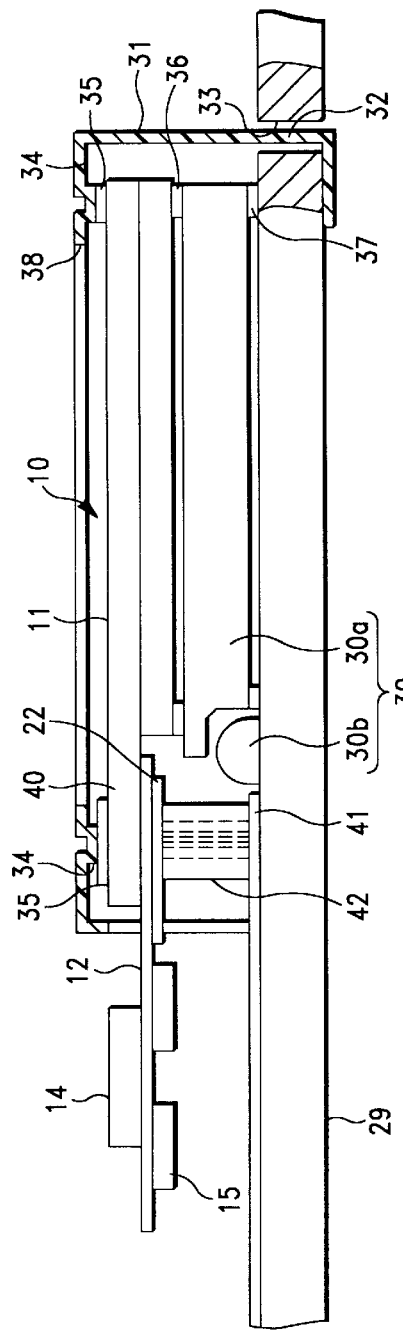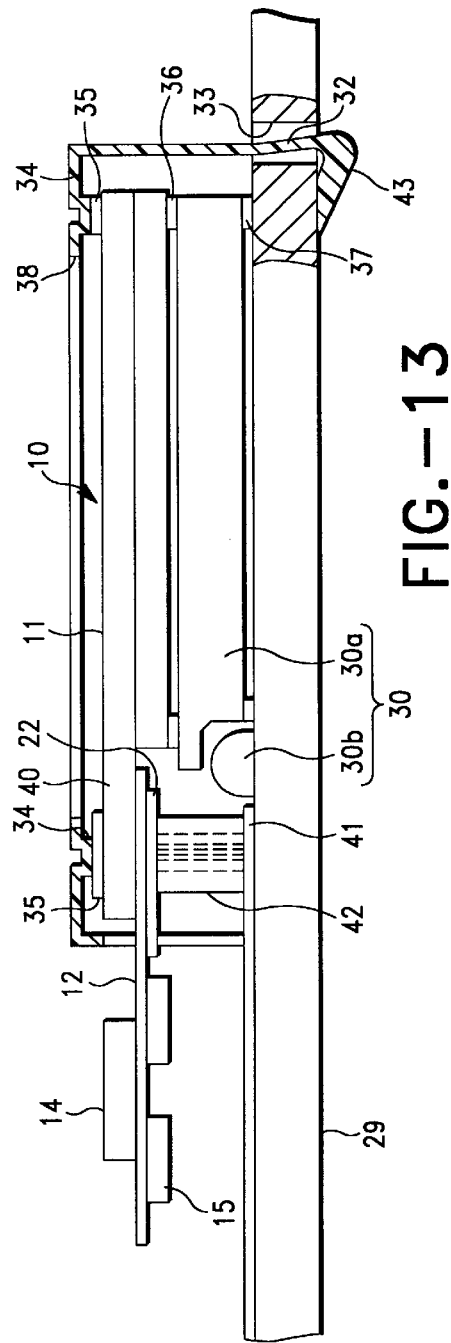

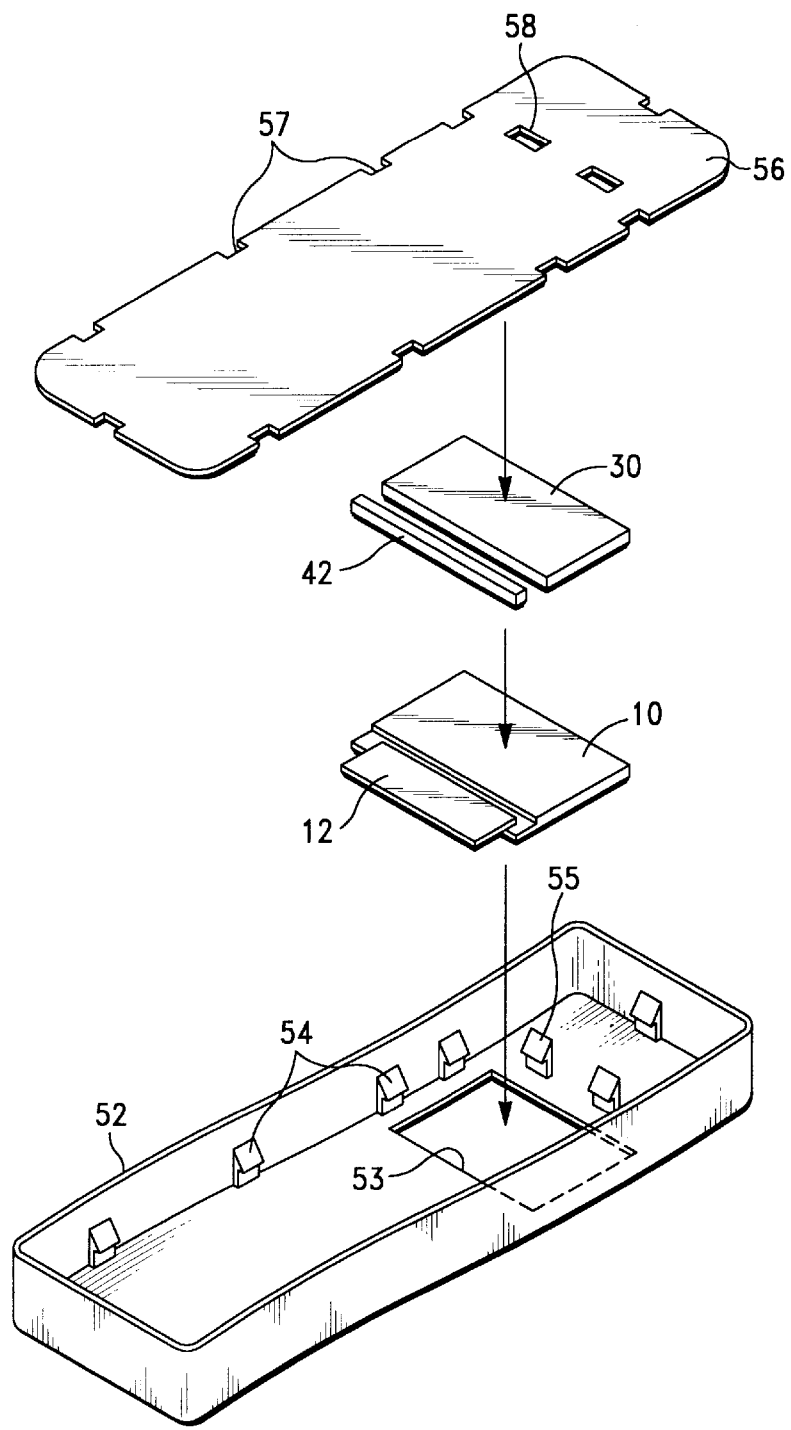
FIG.—19

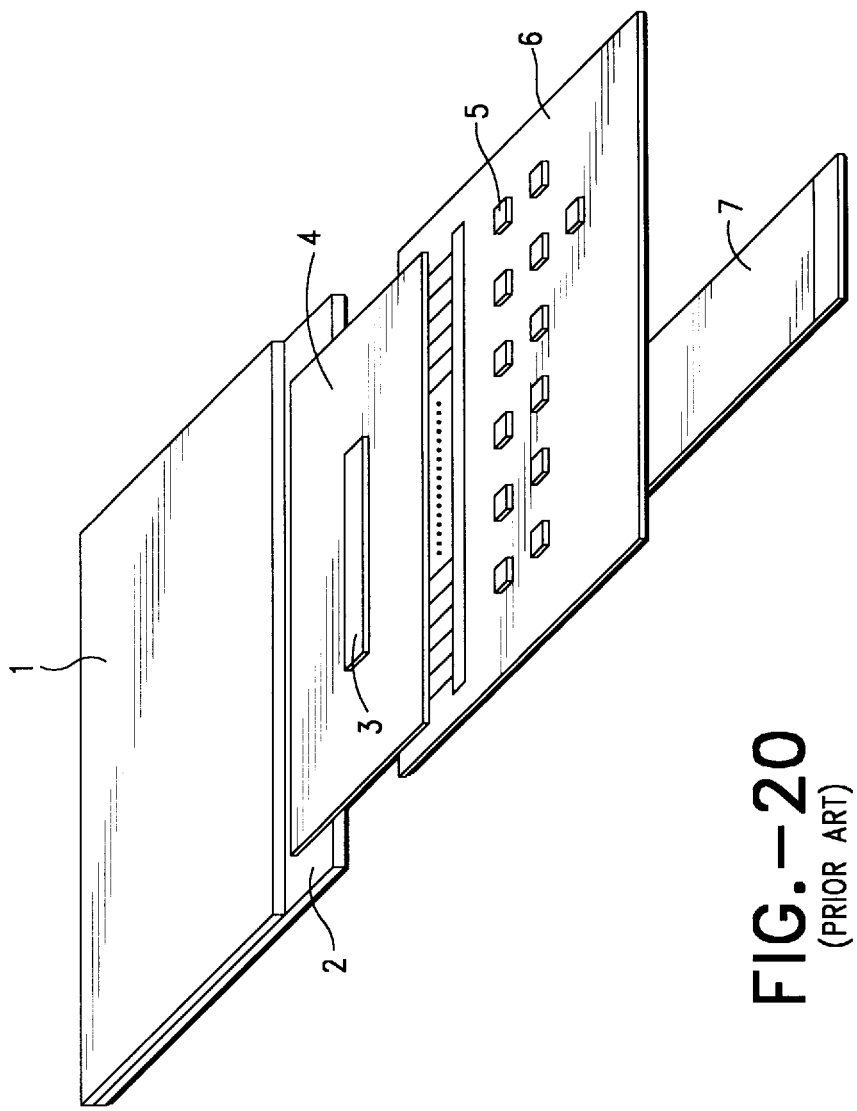
FIG.—20
(PRIOR ART)

LIQUID CRYSTAL DISPLAY DEVICE, ITS MOUNTING STRUCTURE AND ELECTRONIC DEVICE

BACKGROUND OF THE INVENTION

1. Field of the Invention

This invention relates to the structure of a liquid crystal display device and to the structure for mounting the liquid crystal display device in a main unit or various devices, and it also relates to an electronic device equipped with the liquid crystal display device.

2. Background of the Invention

Generally, liquid crystal display devices comprise a liquid crystal cell wherein a liquid crystal layer is sandwiched between two glass substrates, a drive circuit for driving the liquid crystal, a control circuit for controlling liquid crystal display, and a power supply circuit for supplying the power and input signals. Currently, connection of the liquid crystal cell and the drive circuit is performed most commonly by a TAB system that uses TAB technology to batch connect the tape carrier package (TCP) whereon the semiconductor chip for liquid crystal drive is mounted.

A typical example of a prior art liquid crystal display wherein the TAB system is utilized is shown in FIG. 20. The output terminals of TCP 4 whereon semiconductor chip 3 for liquid crystal drive is mounted are connected by an anisotropic conductive film, for example, to the input terminals disposed along one side 2 of liquid crystal cell 1. Circuit board 6 whereon electronic components 5; e.g., chip capacitors, resistors and controllers, other than said semiconductor chip for liquid crystal drive are mounted is connected to the input terminals of TCP 4 by soldering. Input cable 7 made from a flexible film wiring sheet, for example, is connected to circuit board 6, whereby said liquid crystal display device is connected to the main electronic device unit and power and signals are input.

However, since liquid crystal display devices manufactured by the prior art TAB method require at least TCP 3, circuit board 6 and input cable 7 in addition to liquid crystal cell 1 as component parts, there are many parts, which increases the number of connections for connecting them, thus increasing the number of production processes and labor, and this in turn can increase production costs and lower production yield. Further, since input and output wiring is formed on each of said TCP, circuit board and input cable, the mounting area is greatly increased, thus increasing the size of the so-called frame member and resulting in a liquid crystal display device that is large overall. Also, a larger area must be provided in the electronic device in order to mount the liquid crystal display device, thus greatly restricting product design and making it larger than necessary. Moreover, compared to the overall size of the device, the area of the display screen is relatively small and sufficient information cannot be displayed. This is particularly a major obstacle in realizing greater compactness and functionality in developing portable electronic products such as cellular telephones.

Other methods for connecting liquid crystal cells and drive circuits are also known such as the rubber connection method that uses conductive rubber, connection methods that use a heat seal or flexible film wiring sheet, and the chip on glass (COG) method that connects the semiconductor chip for liquid crystal drive directly to the glass substrate surface of the liquid crystal cell. The rubber connection method, though it does make assemble easy, uses conductive rubber to connect the output of the drive circuit to the input of the liquid crystal cell, and therefore it cannot readily accommodate tight pitches, and since the drive circuit is disposed behind the liquid crystal cell, it is difficult to attach a backlight, thus increasing the thickness of the entire device.

The COG method that is now being used mounts the semiconductor chip for liquid crystal drive directly by patterning input/output wiring and electrodes from transparent indium tin oxide (ITO) on the peripheral surface of the glass substrate from which the liquid crystal cell is configured. Therefore, though the number of parts and connections is small, the wiring must be thick and the mounting area increased due to the relatively high electrical resistance of ITO, thus greatly increasing the frame area. Further, since the input/output wiring and the input bus wiring are disposed as cross wiring on the same surface, the production cost is extremely high.

The purpose of the invention is to provide a compact liquid crystal display device that reduces production costs while improving productivity by using fewer parts and reducing the number of connections, whereby the production process is simplified and labor is reduced, and that also can accommodate the miniaturization of electronic devices by reducing the mounting surface area and the frame surface area.

Another purpose of the invention is to offer a structure whereby the assembly operation can be simplified, labor reduced, processes automated, productivity improved and production costs reduced by means of a relatively simple configuration in cases wherein the liquid crystal display device is mounted in an electronic device, while also facilitating the mounting of the liquid crystal display device in a compact space.

Yet another purpose of the invention is to offer a compact, easy-to-use, highly-functional electronic device with superior portability and that is capable of expanding the display surface area and the amount of information displayed while providing a high freedom of product design and compactness particularly in electronic devices equipped with a liquid crystal display device.

SUMMARY OF THE INVENTION

According to the first profile of the invention, a liquid crystal display device is offered that has a liquid crystal cell and a circuit board whereon the semiconductor chip for liquid crystal drive and all or some of the other electronic components necessary for drive and control of the liquid crystal are mounted and wherein the input terminals of said liquid crystal cell and the output terminals of said circuit board are connected directly.

By mounting all or some of the other electronic components required by the circuit for driving and controlling the liquid crystal as well as the semiconductor chip for liquid crystal drive on one circuit board as required and connecting their output directly to the liquid crystal cell input, the number of components can be reduced, whereby the number of connections can be reduced and the labor required for assembly reduced. Therefore, production costs can be reduced and productivity can be improved. Also, since the area of the wiring pattern is greatly reduced together with the connection locations, the area of the circuit board itself and the overall mounting area can be reduced. Further, since the liquid crystal cell and the circuit board are disposed on nearly the same plane, the entire liquid crystal display device can be configured smaller and thinner.

In addition to chip capacitors, resistors, etc., as the other electronic components, the controllers and other electronic components necessary for control of liquid crystal display can also be mounted on said circuit board. Also, in the case of a large liquid crystal cell, a plurality of groups of semiconductor chips for liquid crystal drive and other electronic components can be mounted on one circuit board and connected directly to the liquid crystal cell. Also, an anisotropic conductive film, adhesive or other methods from the prior art can be used as the means for connecting the output terminals of the circuit board directly to the input terminals of the liquid crystal cell.

Commonly used hard materials such as composite materials of glass fiber, aramid fibers or a combination of the two with epoxy resin, polyimide resin or bismaleid triazine (BT) resin, or epoxy resin, polyimide resin or BT resin used alone, mixed or in a compound are easy to handle as substrate materials for circuit boards. Since these substrate materials are cheaper than TCP film materials, circuit boards can be produced at lower cost, thus lowering the production cost of liquid crystal display devices.

According to the second profile of the invention, a mounting structure for the liquid crystal display device is offered whereby, in order to mount the liquid crystal display device, which has a liquid crystal cell and a circuit board whereon the semiconductor chip for liquid crystal drive and all or some of the other electronic components for driving and controlling the liquid crystal are mounted and wherein the input terminals of said liquid crystal cell and the output terminals of said circuit board are connected directly, in the main unit, the input terminals of said circuit board and the terminals of said main unit are connected via a rubber connector made from conductive rubber.

By means of this invention, since the input terminals of the circuit board can have a relatively wide pitch, e.g., 0.5 to 1 mm, a connector made of conductive rubber can be easily used to connect it to the terminals of the main unit which supplies the power and input signals. Therefore, the liquid crystal display device can be easily mounted and it is possible to automate the assembly operation by means of robots, etc.

By forming the input terminals of the circuit board on the back side of the output terminals at this time, the surface area of the circuit board can be made smaller, and therefore the liquid crystal display device can be made more compact, thus requiring a smaller space for mounting.

If the rubber connector is held in a compressed state between the circuit board and the main unit when the liquid crystal display device is fixed in the main unit by a fixing means, installation of the liquid crystal display device is simplified and conductivity between the input terminals of the circuit board and the terminals of the main unit can be easily maintained. It is desirable to configure this fixing means into the case of the main unit in order to reduce the number of components.

According to the third profile of the invention, an electronic device is offered that is equipped with a display means comprising a liquid crystal display device having a liquid crystal cell and a circuit board whereon are mounted the semiconductor chip for liquid crystal drive and all or some of the other electronic components necessary for driving and controlling the liquid crystal and wherein the input terminals of said liquid crystal cell are connected directly to the output terminals of said circuit board.

By means of the invention, by mounting a liquid crystal display device that is compact and reduces production costs as described above, the freedom of design of the electronic device is improved, thus making it possible to offer electronic devices that are compact and are suited to portability at low cost. Moreover, since the size of the display screen can be made large in relation to the size of the device, it is easier to read and more information can be displayed, thus improving the functionality and ease of use of the electronic device.

The input terminals of the circuit board and the main electronic device unit can be connected via a flexible cable. In this case, by selecting the appropriate cable shape, dimensions, material and flexibility and setting the appropriate location for connection of the cable to the electronic device, the liquid crystal display device can be mounted under optimum conditions. Also, the input terminals of the circuit board and the terminals of the electronic device can be connected directly by soldering or by an anisotropic conductive film. Further, a connector can be provided on the electronic device and the circuit board can be connected either directly to this or by joining via the above-mentioned cable.

According to another embodiment of this invention, the input terminals of the circuit board and the terminals of the electronic device can be connected via a rubber connector made from conductive rubber. In this case, by fixing the liquid crystal display device in the electronic device via a fixing means and maintaining the rubber connector between the circuit board and the main electronic device unit in a compressed state, assembly is simplified. Further, if said fixing means is the case of the electronic device, the number of components can be reduced. If the input terminals of the circuit board are formed on the back side of the output terminals, not only can the surface area of the circuit board can be reduced, but the rubber connector can be reliably compressed and held in the desired location without a special means or member if said fixing means presses the liquid crystal display device against the main electronic device unit on the periphery of the liquid crystal cell to which the circuit board is connected.

BRIEF DESCRIPTION OF THE DRAWINGS

Objects and attainments together with a fuller understanding of the invention will become apparent and appreciated by referring to the following description and claims taken in conjunction with the accompanying drawings.

Below, the preferred embodiments of the invention are described in detail by referring to the attached drawings.

FIG. 5 and FIG. 6 are perspective views showing the third and fourth embodiments, respectively, of the liquid crystal display device of the invention.

FIG. 9 is a perspective view showing the sixth embodiment of the liquid crystal display device of the invention, and FIG. 10 is a cross section of its principal parts.

FIG. 12 is a cross section of the mounting structure.

FIG. 13 is a cross section showing a variation of the embodiment of the mounting structure of the liquid crystal display device.

FIG. 19 is an exploded perspective view showing the cellular telephone to which the mounting structure in FIG. 13 has been applied.

FIG. 20 is a perspective view showing a liquid crystal display device of the prior art.

DESCRIPTION OF THE PREFERRED EMBODIMENTS

Figure 1:
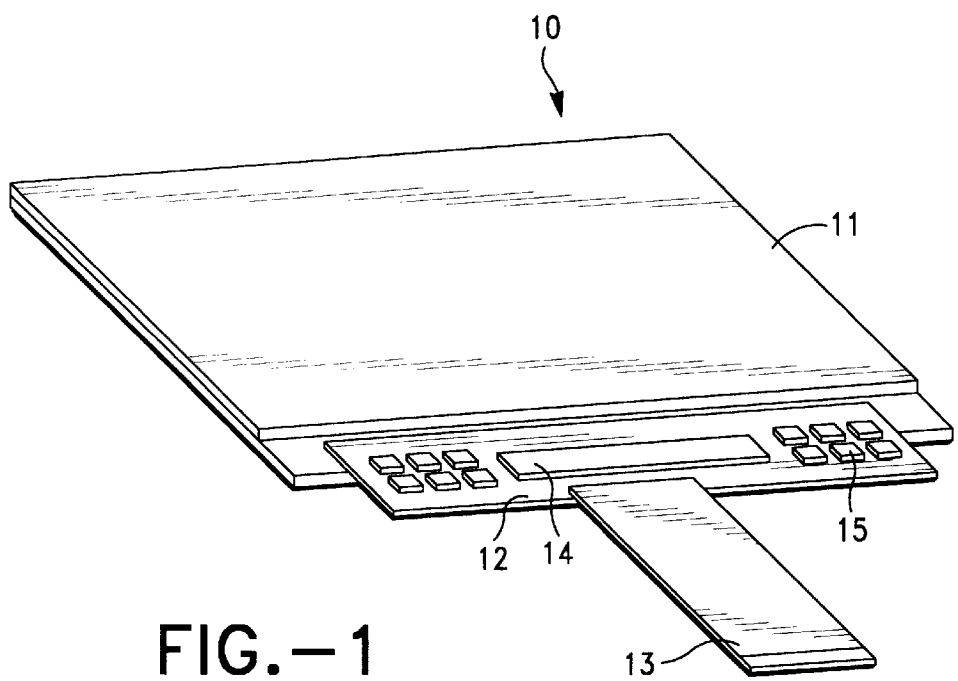
FIG. 1 is a perspective view showing the first embodiment of the liquid crystal display device of the invention.
Figure 2:
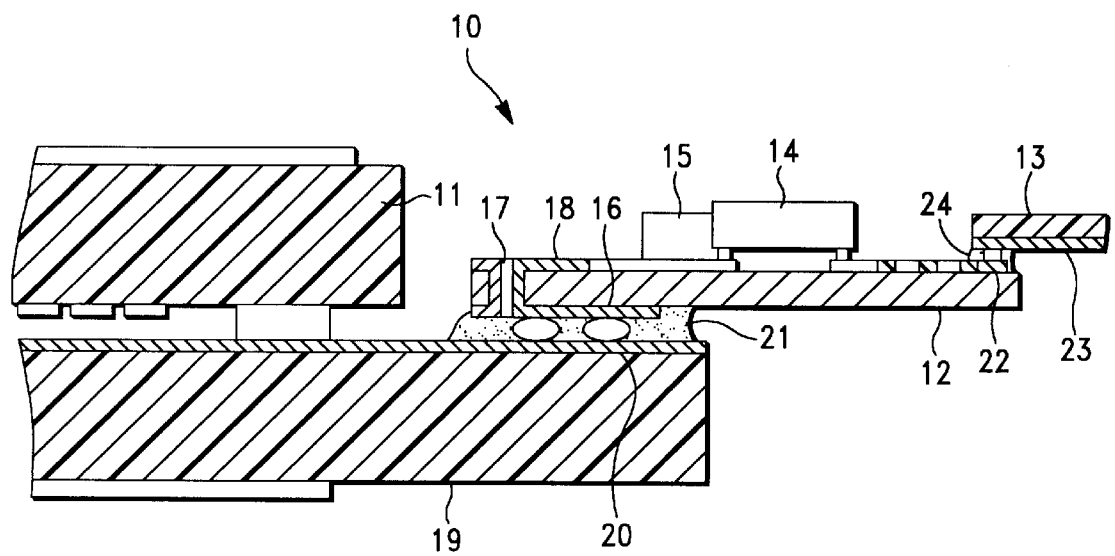
FIG. 2 is a cross section of its principal parts.

FIG. 1 and FIG. 2 show the first embodiment of the liquid crystal display device of the invention. Liquid crystal display device 10 comprises liquid crystal cell 11 wherein a liquid crystal layer is sandwiched between two glass substrates, circuit board 12 and input cable 13. Circuit board 12 is connected directly to one side of liquid crystal cell 11. In addition to semiconductor chip 14 for liquid crystal drive, chip capacitors, chip resistors and other electronic components 15 that make up the liquid crystal drive circuit are mounted on circuit board 12. Either all or some of electronic components 15 necessary to make up said drive circuit are selected and mounted.

Semiconductor chip 14 can be connected to circuit board 12 using the commonly known anisotropic conductive film. In this embodiment, conductive grains comprising polystyrene grains 5 um in diameter and coated with Ni—Au and anisotropic conductive film comprising an adhesive made up mainly of an epoxy adhesive are used and are bonded by thermocompression at a temperature of 180° C. and a pressure of 10 gf/bump for 30 seconds. Of course, the free chip method wherein direct face-down bonding to solder bumps, etc., is performed, a method that connects the semiconductor chip bumps directly, and other known methods from the prior art can be used to connect semiconductor chip 14. Also, in this embodiment, electronic components 15 are connected to circuit board 12 by soldering. In other embodiments, connection by means of silver paste or other conductive adhesive or anisotropic film is possible, and these are effective when mounting small chip capacitors and other electronic components.

As is well shown in FIG. 2, output terminals 16 of circuit board 12 are formed on the side opposite semiconductor chip 14 and are connected to output wiring 18 of said semiconductor chip via through-hole 17. LCD terminals 20 formed from transparent ITO electrodes, for example, and connected to that electrode pattern are formed on the inside surface on the periphery of lower glass substrate 19 of liquid crystal cell 11. Circuit board 12 is located such that its output terminals 16 are positioned opposite corresponding LCD terminals 20 and anisotropic conductive film, (ACF) 21 is sandwiched between them, and they are electrically and mechanically connected all at once by thermocompression using a prescribed compression and heating tool. In this embodiment, conductive grains comprising polystyrene grains 10 μm in diameter and coated with Ni—Au and an adhesive made up mainly of epoxy adhesive are used as the anisotropic conductive film 21, and connection was performed under the compression bonding conditions of a temperature of 170° C. at a pressure of 3 MPa for 20 seconds. In another embodiment, an adhesive can be used alone in place of the anisotropic conductive film and output terminals 16 of circuit board 12 can be connected directly to LCD terminals 20 such that they are electrically conductive. In this connection method, the danger of short-circuits due to conductive grains resulting from the use of an anisotropic film is eliminated and connection can be made using a tighter pitch.

Input terminals 22 of circuit board 12 are connected using wiring pattern 23 of input cable 13 and anisotropic conductive film 24. In this embodiment, anisotropic conductive film 24 comprising conductive grains made up of nickel metal grains 3 to 10 μm in diameter and an adhesive whose main component is an epoxy adhesive is used, and connection is performed by compression bonding at a temperature of 170° C. and a pressure of 3 MPa for 20 seconds. By using an anisotropic conductive film in this manner, fine connection pitches can be accommodated, thus facilitating high density mounting. Also, circuit board 12 and input cable 13 can be connected by hand or by machine using conventional soldering. Further, silicon resin, acrylic resin, urethane resin or other molded material can coated on the connections of circuit board 12 and input cable 13 for moisture protection, dust protection, and protection from damage due to mechanical contact. This kind of molded material can also be applied in a similar manner to the connection between above-mentioned circuit board 12 and liquid crystal cell 11 and the connection of semiconductor chip 14 and electronic components 15 to circuit board 12.

In this embodiment, a circuit board wherein copper foil is coated in a thickness of 9 μm on both sides of a 0.1-mm-thick glass epoxy substrate, wiring patterns are formed by etching, and conductivity of both surfaces is achieved via through-holes is used as circuit board 12. It is desirable to coat the wiring pattern surfaces with Ni—Au to prevent migration or other problems. A glass epoxy substrate 0.05 to 0.8 mm thick can be used. A composite material wherein aramid fibers or a combination of aramid fibers and glass fibers is used in place of glass fibers with polyimide resin or bismaleid triazine (BT) resin in place of epoxy resin can be used as the substrate for circuit board 12, or epoxy resin, polyimide resin or BT resin used either alone or in a composite material can be used. Further, instead of a two-sided wiring board as in this embodiment, a one-sided wiring board or 3-layer, 4-layer or other multiple-layer substrate can be used as circuit board 12. If a one-sided wiring board is used, the output terminals must be formed on the same surface the semiconductor chip for liquid crystal drive is mounted, but the substrate cost will be cheaper. If a multiple-layer substrate is used, a gland layer can be employed and countermeasures for noise such as making the power source wiring pattern thicker can be easily implemented.

As described here, by mounting all or some of the chip capacitors, chip resistors and other electronic components required by the drive circuit for the liquid crystal, as well as the semiconductor chip for liquid crystal drive, on one circuit board according to this invention,, the area required for mounting these electronic components can be minimized and the area of the wiring pattern can be minimized, thus making it possible to reduce the overall mounting area. Further, since the circuit board is connected to the periphery of the liquid crystal panel on the same plane, the frame area can be made smaller, thus facilitating a smaller, thinner liquid crystal display device overall and realizing a more compact configuration. Also, since the circuit board is connected directly to the input side of the liquid crystal cell and the power source and input signals are supplied from the input cable, there are fewer parts and the number of connections is reduced, thus making it possible to reduce assembly labor, reduce production costs and improve productivity.

Figure 3:
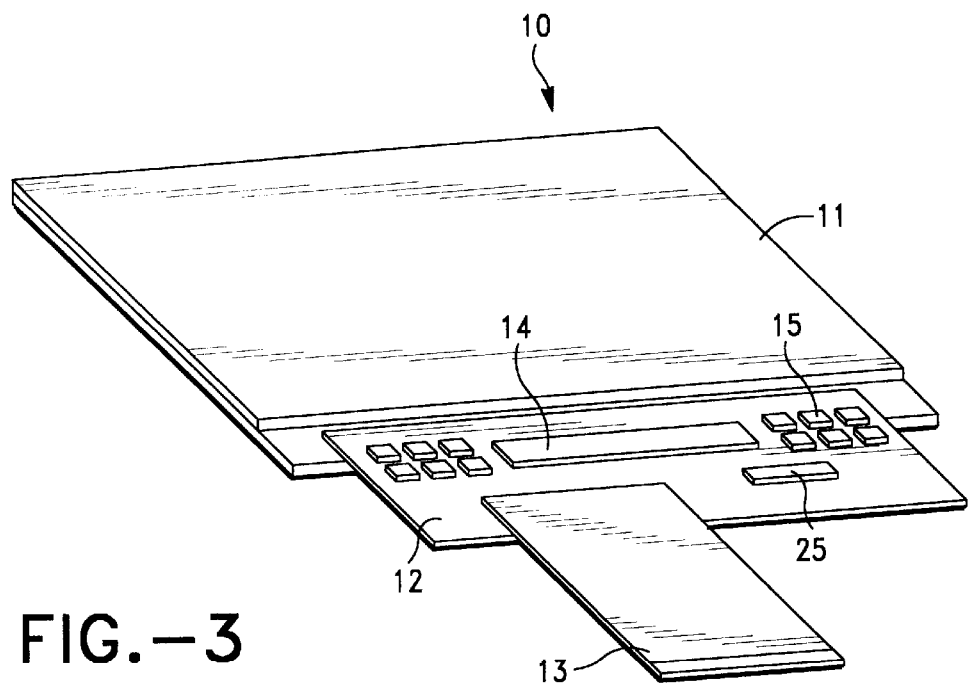
FIG. 3 is a perspective view showing the second embodiment of the liquid crystal display device of the invention.
Figure 4:
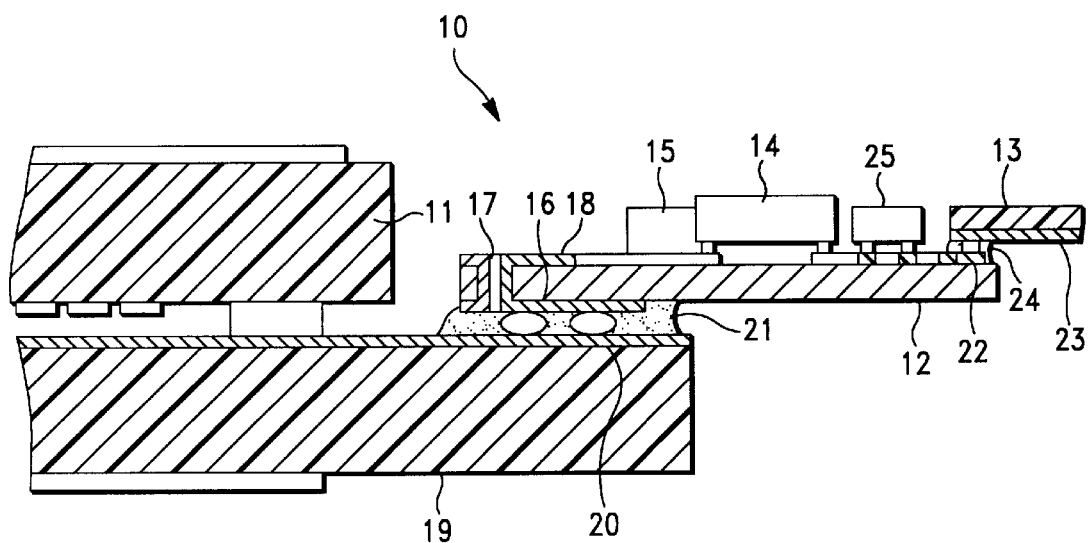
FIG. 4 is a cross section of its principal parts.

FIG. 3 and FIG. 4 show the second embodiment of the liquid crystal display of the invention. This embodiment differs from the above-mentioned first embodiment in that controller 25 for controlling liquid crystal display is also mounted on circuit board 12. Controller 25 is connected using an anisotropic conductive film as explained above for semiconductor chip 14 for liquid crystal drive, but of course it can be connected by other prior art methods using solder or adhesive. Also, in addition to controller 25, all or some of the other electronic components that make up the control circuit for controlling liquid crystal display can be mounted on circuit board 12.

By mounting the electronic components for controlling liquid crystal display as well as the electronic components for liquid crystal drive on one circuit board according to this embodiment, the area for mounting the semiconductor chip and the other electronic components and the area of the wiring pattern required for forming the drive and control circuits can be minimized. By this means, the area of the circuit board can be made smaller and the entire liquid crystal display device can have a more compact configuration. Also, by being able to reduce the number of components and make the substrate area smaller, costs can be further reduced.

FIG. 5 shows the third embodiment of the liquid crystal display device of the invention. In this embodiment, the input cable of the first embodiment is eliminated and input terminals 22 are formed in a straight line at a fixed pitch on the back side of circuit board 12 whereon semiconductor chip 14 for liquid crystal drive and other electronic components 15 are mounted. Input terminals 22 are formed in a shape, for example, suited to direct connection via soldering, anisotropic conductive film or adhesive to the terminals for inputting power and signals from the main electronic device unit wherein the liquid crystal display device is mounted. Input terminals 22 are connected to the input side of semiconductor chip 14 via through-holes provided in circuit board 12. Of course, input terminals 22 can be disposed on the same surface of circuit board 12 as said semiconductor chip.

By eliminating the input cable according to this embodiment, the number of parts can be reduced and costs lowered even more. Further, since the connection area with the electronic device in which the liquid crystal display device of this embodiment is mounted can be made smaller, the main electronic device unit as well as the liquid crystal display device can be made more compact.

FIG. 6 shows the fourth embodiment of the liquid crystal display device of the invention. Input terminals 22 are formed along one edge of circuit board 12 of this embodiment opposite liquid crystal cell 11. Input terminals 22 are formed in the shape of through-holes cut in half by cutting a plurality of half-circle notches 26 at fixed intervals along said edge of circuit board 12 and affixing a conductive material inside said notches. By configuring them in this way, well-shaped bumps can be formed when soldering input terminals 22, thus simplifying soldering and making the connection highly reliable.

In another embodiment, input terminals 22 can be formed by eliminating notches 26 and simply applying conductive material to the edge of circuit board 12. Input terminals 22 can also be extended to the back side of circuit board 12.

Figure 7:
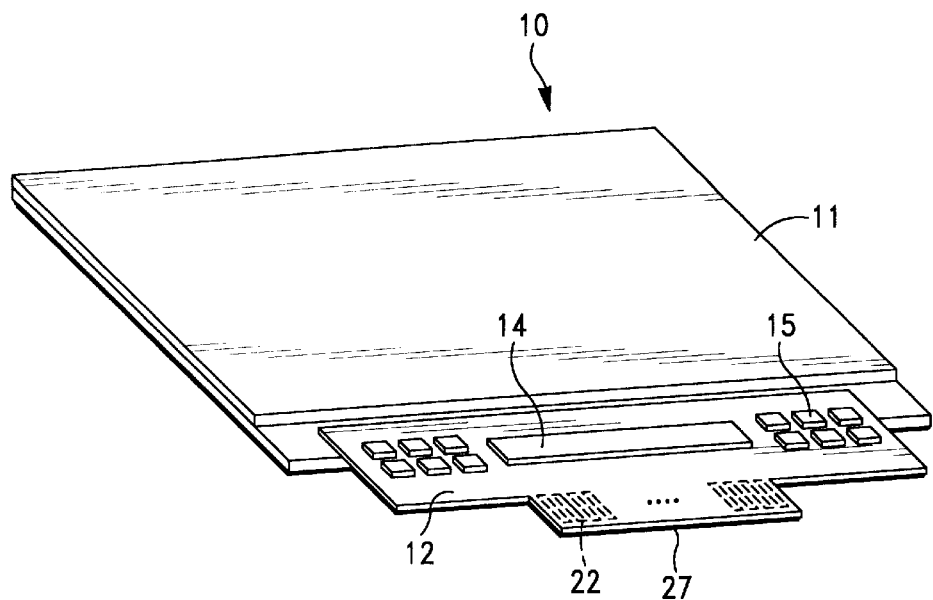
FIG. 7 is a perspective view showing the fifth embodiment of the liquid crystal display device of the invention.
Figure 8:
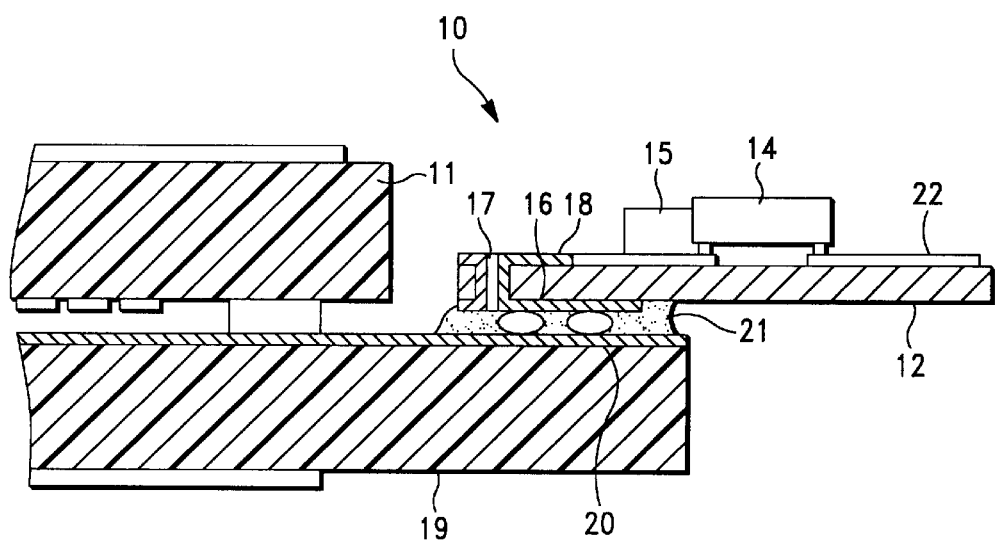
FIG. 8 is a cross section of its principal parts.

FIG. 7 and FIG. 8 show the fifth embodiment of the liquid crystal display device of this invention. Connection member 27 is provided by protruding the middle part of circuit board 12 opposite liquid crystal 11. Connection member 27 is formed into a rectangular shape whose dimensions are set such that it can be inserted directly into a female connector on the main electronic device unit, and input terminals 22 are formed in a fixed pitch on the top surface. Depending on their number and the dimensions of said connector and circuit board, input terminals 22 can be formed on both sides of connection member 27. Depending on the size and type of the connector, the one edge of circuit board 12 whereon input terminals 22 are disposed can be inserted directly into the connector as the connection member.

Since the electrical connection is achieved by merely inserting connection member 27 of circuit board 12 joined as a single unit with liquid crystal cell 11 into the connector, mounting of the liquid crystal display device and assembly of electronic device are simplified. Also, since the liquid crystal display device can be easily removed after mounting, no special tools or techniques are required and anyone can replace it, thus simplifying operation, particularly in electronic devices requiring regular maintenance.

FIG. 9 and FIG. 10 show a variation of the fifth embodiment described above. In this embodiment, circuit board 12 is connected to the inside surface on the edge of the upper glass substrate of liquid crystal cell 11. Circuit board 12 is provided with connection member 27 as in the circuit board in FIG. 7, and output terminals 16 and input terminals 22 are formed on the surface whereon semiconductor chip 14 for liquid crystal drive is mounted. By disposing output terminals 16 on the surface whereon semiconductor chip 14 is mounted according to this embodiment, through-holes do not need to be made on the output side where a fine terminal pitch is required, thus making it easier and cheaper to manufacture circuit board 12.

Figure 11:
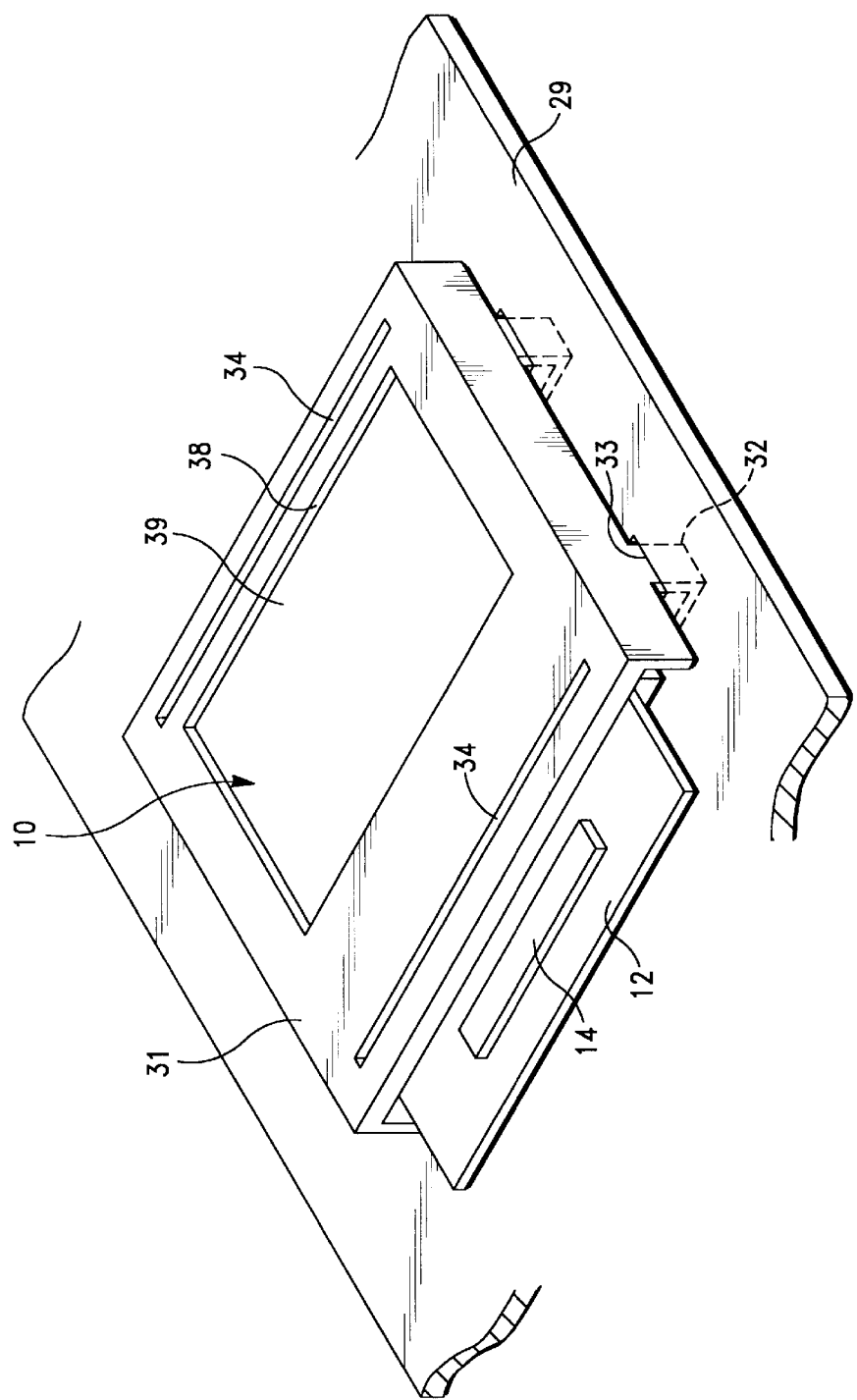
FIG. 11 is a perspective view showing the mounting structure of the liquid crystal display device of the invention.

FIG. 11 and FIG. 12 show a preferred configuration for mounting the liquid crystal display device of the invention as a means of display in electronic devices, etc. Light guide 30a of backlight means 30 is disposed between liquid crystal display device 10 of this embodiment and main unit substrate 29 whereon it is mounted, and square frame-shaped attachment member 31 is affixed on top of these. LED 30b is disposed on main unit substrate 29 immediately to the side of said light guide as the light source of backlight means 30. Attachment member 31 is open on one side such that circuit board 12 of liquid crystal display device 10 can partially extend outside of it, and the remaining three sides each have two feet 32 protruding down. Feet 32 of attachment member 31 are inserted in the six holes 33 provided in said main unit substrate, and then by bending the ends of the feet, liquid crystal display device 10 and light guide 30a are fixed in place such that they are pressed against main unit substrate 29. In this embodiment, the light guide and LED of backlight means 30 are fixed separately, but in another embodiment, a backlight means is used wherein the light guide and LED are one unit, which can be installed like the light guide in this embodiment.

Reinforcing ribs 34 are formed on the top surface of attachment member 31 to prevent its deformation, and cushions 35, 36 and 37 made from rubber, plastic sheet, two-sided tape or other adhesive are disposed at the positions of said ribs between attachment member 31 and liquid crystal cell 11, between the liquid crystal cell and light guide 30a and between light guide 30a and main unit substrate 29. Attachment member 31 has a large rectangular window 38 on its top surface to facilitate viewing of the display screen of liquid crystal display device 10.

Some as in the embodiment shown in FIG. 9 and FIG. 10, circuit board 12 is connected to the inside surface of upper glass substrate 40 of liquid crystal cell 11 in liquid crystal display device 10. Semiconductor chip 14 for liquid crystal drive is mounted and the output terminals are formed on the top surface of circuit board 12. The chip capacitors and other electronic components 15 required by the liquid crystal drive circuit are mounted and the input terminals 22 are formed on the bottom surface of circuit board 12. Terminals 41 for supplying power and input signals to liquid crystal display device 10 are provided on the top surface of main unit substrate 29. Rubber connector 42 comprising a known conductive rubber, for example, wherein conductive members and insulation members are alternated is sandwiched between main unit substrate 29 and circuit board 12, whereby input terminals 22 and output terminals 41 are electrically connected. Since the pitch of input terminals 22 of circuit board 12 can be relatively large at 0.5 to 1 mm, a rubber connector is sufficient for connection.

According to the invention, circuit board 12 and rubber connector 42 are lined up, and assembly is performed such that the liquid crystal display device is sandwiched between the attachment member and the main unit substrate. Therefore, rubber connector 42 is retained in the compressed state between circuit board 12 and main unit substrate 29. Since assembly of the liquid crystal display device is simplified like this, it is possible to automate the mounting process of the liquid crystal display device in the production line of the electronic device by using robots, etc., thus improving productivity and lowering production costs.

FIG. 13 shows a variation of the mounting structure for the liquid crystal display device shown in FIG. 11 and FIG. 12 described above. In this variation of the embodiment, attachment member 31 is made from molded plastic, for example, and it is formed as one unit with hooks capable of elastic deformation at the ends of feet 32. Feet 32 of attachment member 31 are inserted in holes 33 of main unit substrate 29, and hooks 43 are secured to the back side of said main unit substrate by a one-touch operation. By this means, the liquid crystal display device can be assembled more easily.

In each of the embodiments in FIG. 11 to FIG. 13, square frame-shaped attachment member 31 was used to secure the liquid crystal display device to the main unit substrate, but according to this invention, if rubber connector 42 can be held in a compressed state between circuit board 12 and main unit substrate 29, attachment means with various structures and shapes can be used. In another embodiment, when the liquid crystal display device is driven by a plurality of semiconductor chips, the plurality of circuit boards whereon each of the semiconductor chips is mounted can be connected directly to the liquid crystal cell, and the input terminals of each of the circuit boards can each be connected via a rubber connector. It is also possible to mount a plurality of semiconductor chips for liquid crystal drive on one circuit board and connect this directly to the liquid crystal cell, while the input terminals of said circuit board can be connected to the main unit via a rubber connector for each semiconductor chip.

Figure 14:
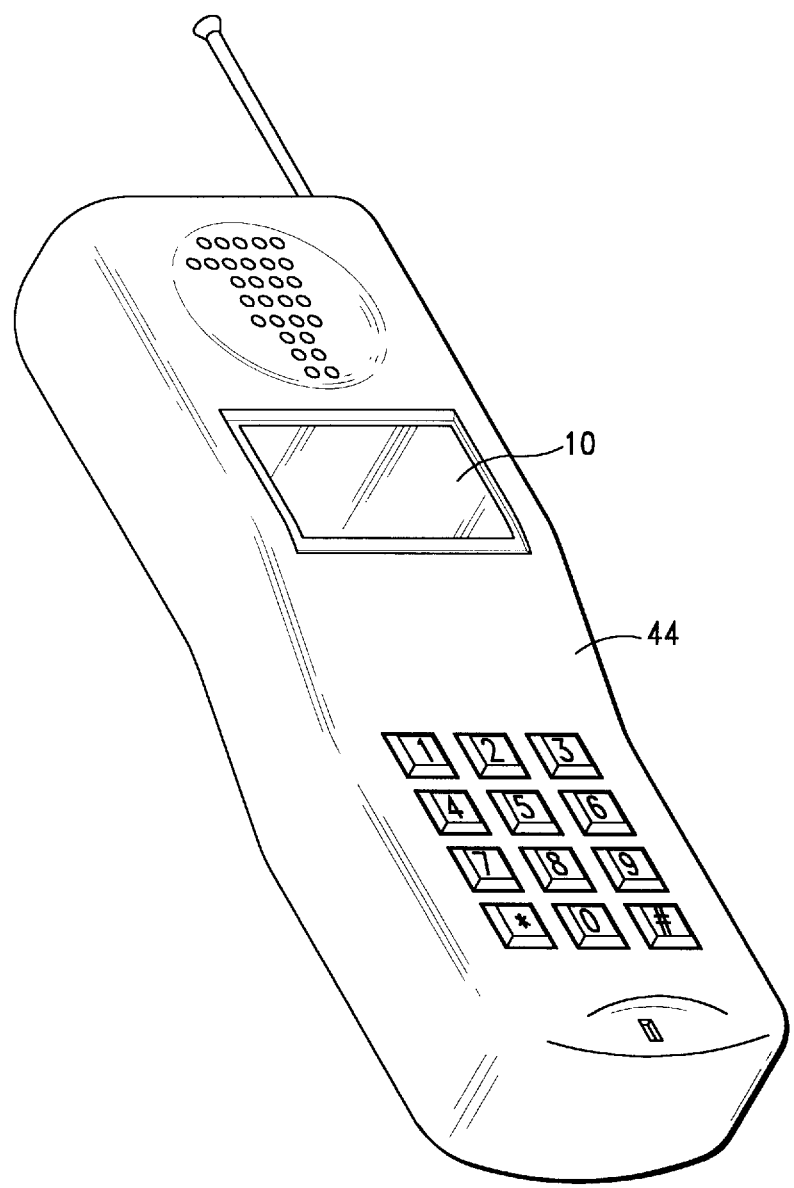
FIG. 14 is a rough perspective view showing a cellular telephone to which the invention has been applied.
Figure 15:
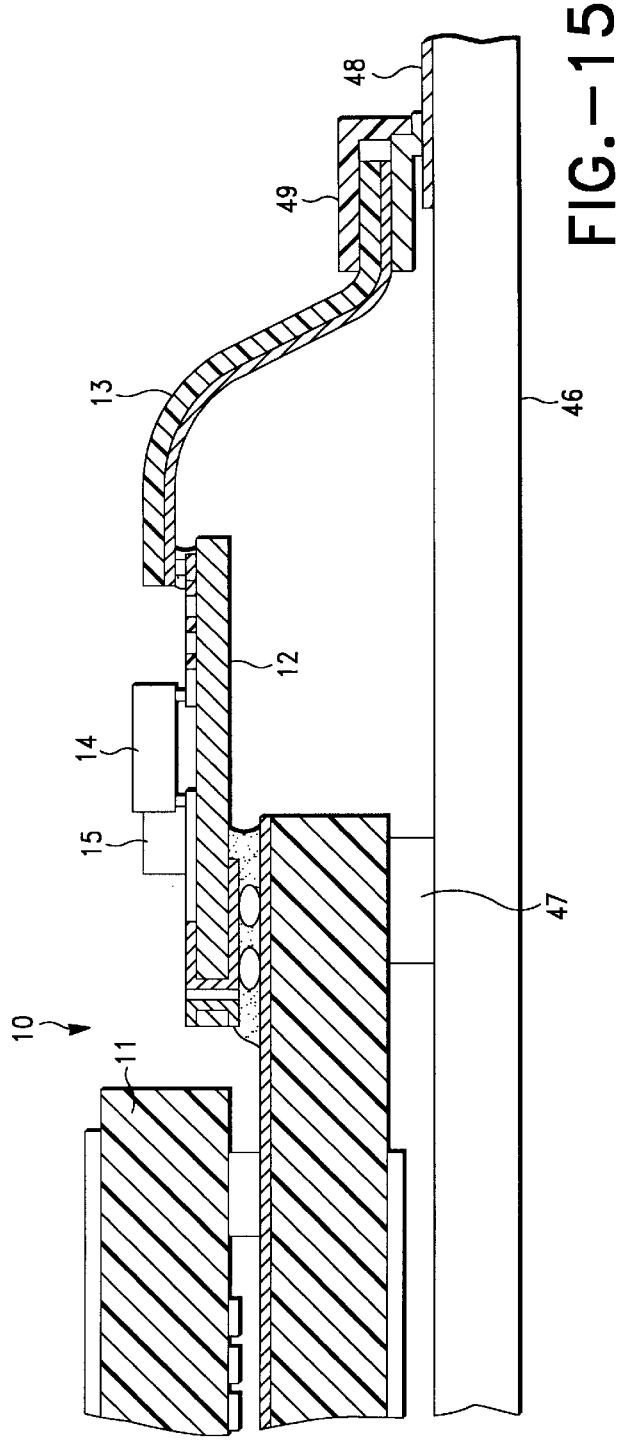
FIG. 15 is a cross section showing the principal parts of a cellular telephone to which the liquid crystal display device of the first embodiment has been applied.

The liquid crystal display device of the invention can be installed in various electronic devices and used, and it is particularly effective in electronic devices requiring portability. As one example of this kind of electronic device, FIG. 14 shows a cellular telephone 44 wherein liquid crystal display device 10 of the invention is installed. In the embodiment shown in FIG. 15, liquid crystal display device 10 of the first embodiment shown in FIG. 1 and FIG. 2 is mounted on main unit substrate 46 of cellular telephone 44. Liquid crystal cell 11 is secured to a prescribed location on main unit substrate 46 by using an adhesive on attachment member 47, which is a cushion that uses silicon rubber or foam urethane as a base material, or two-sided tape that uses a non-woven base material. Output terminals 48 for supplying power and input signals to liquid crystal display device 10 are formed on main unit substrate 46, and female connector 49 is provided for connection to said terminals. Liquid crystal display device 10 is connected to the power source side of main unit substrate 46 by inserting input cable 13 into connector 49, from which it can be removed.

In this embodiment, liquid crystal display device 10 is connected to main unit substrate 46 via input cable 13 as described above, and therefore the freedom of design of the electronic device is improved, and by selecting the appropriate shape, dimensions, material and flexibility of said cable and setting the appropriate layout for the connector, the liquid crystal display device can be installed in the electronic device under ideal conditions. Moreover, according to this invention, the liquid crystal display device can be made smaller and thinner and the frame area reduced in size, and therefore not only can the electronic device in which it is installed be made more compact, the display screen can be made larger. Therefore, a compact, easy-to-use cellular telephone with superior portability can be realized whose display is easy to read and can display much information.

Figure 16:
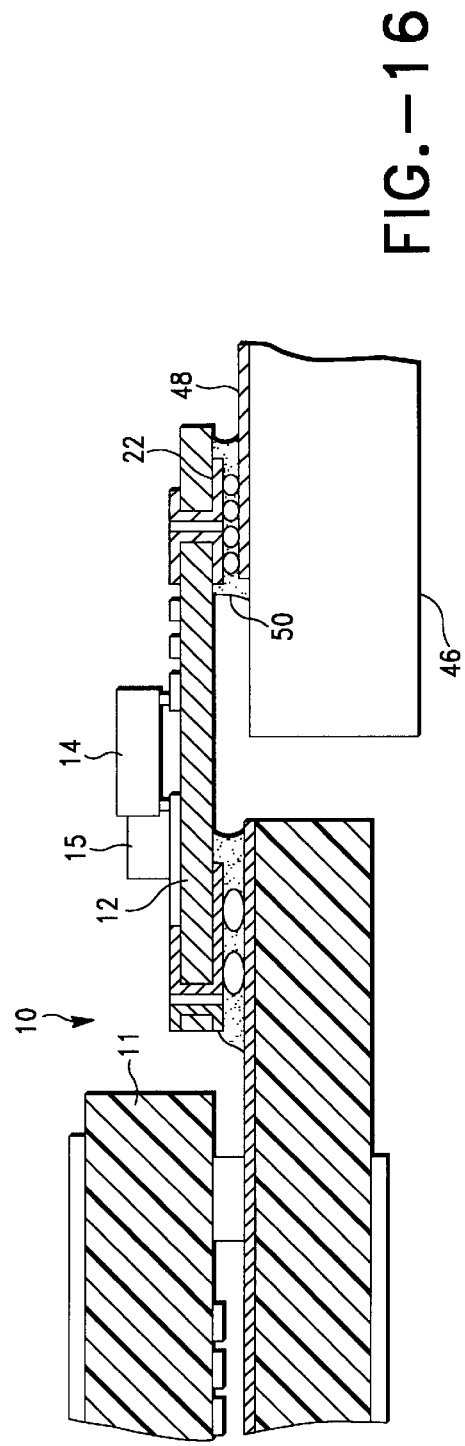
FIG. 16 to FIG. 18 are cross sections showing the principal parts of cellular telephones to which the liquid crystal display devices of the third to the fifth embodiments have been applied, respectively.

In the embodiment in FIG. 16, liquid crystal display device 10 of the third embodiment shown in FIG. 5 is installed in cellular telephone 44. Input terminals 22 of circuit board 12 are connected directly to output terminals 48 of main unit substrate 46 via anisotropic conductive film 50. In this embodiment, conductive grains made up of nickel metal grains 3 to 10 $\mu$m in diameter and a thermosetting adhesive whose main component is an epoxy adhesive is used as the anisotropic conductive film, and bonding is performed by compression at a temperature of 170° C. and a pressure of 3 MPa for 20 seconds. Of course, other anisotropic conductive films can be used and bonding performed under different conditions, and other prior art connection methods can be used.

In this embodiment, an anisotropic conductive film is used to electrically connect the circuit board and the main unit substrate, and therefore it can sufficiently accommodate the terminal pitch. It can reduce the effect of heat, etc., on the main unit substrate or liquid crystal display device when both are subjected to thermocompression. In this embodiment, as well, the cellular telephone is made more compact and the display screen is made bigger, thus greatly improving ease of use.

Figure 17:
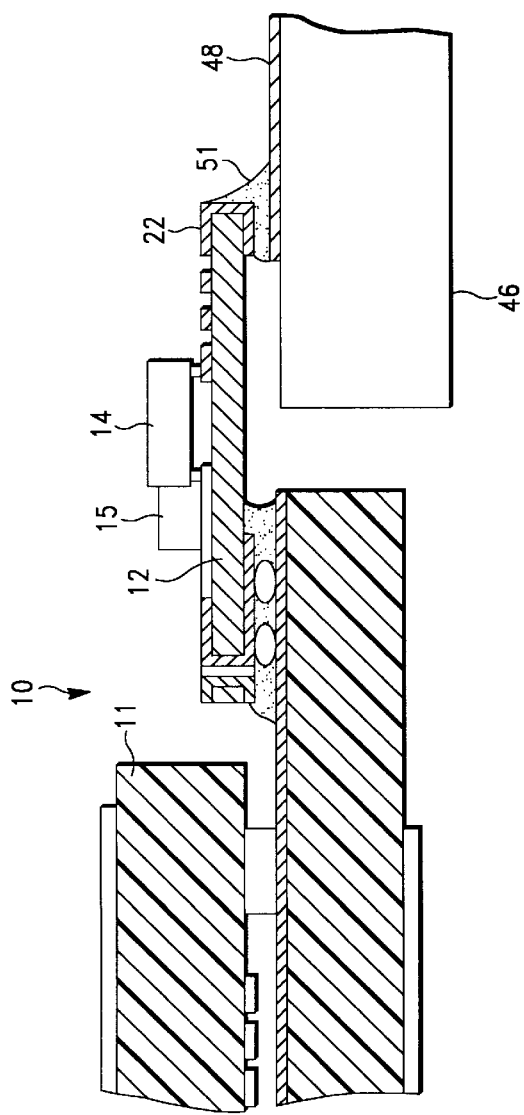

In the embodiment in FIG. 17, liquid crystal display device 10 of the fourth embodiment shown in FIG. 6 is mounted in cellular telephone 44. As described above, input terminals 22 are formed on one edge of circuit board 12 and can be connected directly to output terminals 48 of main unit substrate 46 by soldering. According to this embodiment, solder connections 51 are relatively small, and therefore the area and thickness required for connection between circuit board 12 and main unit substrate 46 can be made small, thus allowing the cellular telephone to be thinner and more compact.

Figure 18:
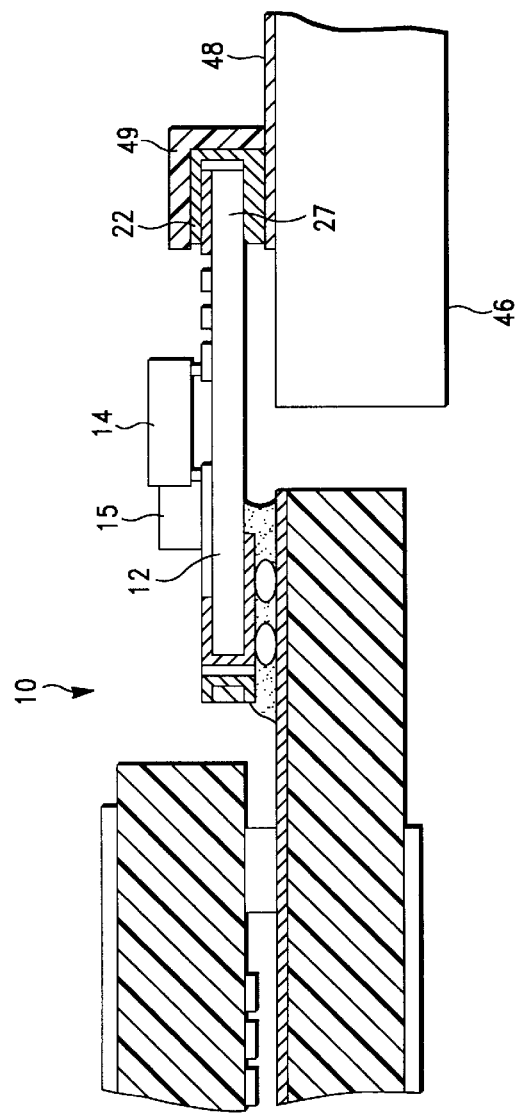

In the embodiment in FIG. 18, liquid crystal display device 10 of the fifth embodiment shown in FIG. 8 is mounted in cellular telephone 44. As in the embodiment in FIG. 15, female connector 49 connected to output terminals 48 is provided on main unit substrate 46. By inserting connection member 27 in connector 49, in which it can be inserted and removed, input terminals 22 of circuit board 12 are connected to output terminals 48 of main unit substrate 46. Therefore, according to this embodiment, the liquid crystal display device can be easily installed and removed from the cellular telephone. For this reason, no special tools or techniques are required and anyone can replace it when required in regular maintenance.

FIG. 19 shows cellular telephone 44 to which the mounting structure of the liquid crystal display device shown in FIG. 13 is applied. In this embodiment, upper case 52 is equivalent to attachment member 31 in FIG. 13 and window 53 corresponding to window 38 is located at the position of liquid crystal display device 10, while the plurality of hooks 54, 55 corresponding to feet 32 and hooks 43 in FIG. 13 are disposed around the inside of upper case 52 and in the vicinity of window 53. Substrate 56 corresponding to main unit substrate 46 in FIG. 13 has a shape and dimensions generally corresponding to the inside shape of upper case 52.

In this embodiment, liquid crystal display device 10 is disposed at a prescribed position inside upper case 52, and then after the light guide (or backlight means 30 formed as one unit with the LED) and rubber connector 42 are positioned on top of that, substrate 56 is fitted in place such that it pushes these against the upper case. Notches 57 and holes 58 are formed in substrate 56 at positions corresponding to hooks 54, 55 of upper case 52. Therefore, substrate 56 is fitted in place in a single operation by aligning its terminals with rubber connector 42 and causing notches 57 and holes 58 to engage corresponding hooks 54, 55 on upper case 52. Rubber connector 42 is retained in a compressed state between circuit board 12 and substrate 56.

By means of this embodiment, the number of component parts can be reduced and the number of connection locations and labor required for assembly can be reduced, thus simplifying the assembly operation of cellular telephones and reducing their production costs. Further, as described above in each of the embodiments, the cellular telephone itself can made smaller and thinner and the amount of displayed information can be increased by enlarging the display screen, whereby ease of use and functionality are improved.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A liquid crystal display device, comprising:
   a liquid crystal cell containing a liquid crystal and having a plurality of input terminals;
   a circuit board directly connected to said liquid crystal cell and having a plurality of input terminals and a plurality of output terminals, said plurality of output terminals being electrically connected to said plurality of input terminals of said liquid crystal cell;
   drive means, mounted on said circuit board, for driving said liquid crystal; and
   at least one electronic component, mounted on said circuit board, for controlling said liquid crystal cell.

2. The liquid crystal display device of claim 1, further comprising an anisotropic conductive film coupling between said plurality of input terminals of said liquid crystal cell and said plurality of output terminals of said circuit board.

3. The liquid crystal display device of claim 1, wherein said liquid crystal cell is connected to said circuit board by adhesion.

4. The liquid crystal display device of claim 1 wherein said circuit board is made from a substrate material which comprises:
   a selected material of glass fibers, aramid fibers and a composite of glass fibers and aramid fibers, and
   a selected material of epoxy resin, polyimide resin and bismaleid triazine resin.

5. The liquid crystal display device of claim 1 wherein said circuit board is made from a substrate material comprising a selected material of epoxy resin, polyimide resin, bismaleid triazine resin and a compound of epoxy resin, polyimide resin and bismaleid triazine resin.

6. The liquid crystal display device of claim 1,
   wherein said circuit board comprises a first surface and a second surface opposite to the first surface;
   wherein said drive means is mounted on the first surface of said circuit board; and
   wherein said plurality of input terminals of said circuit board are disposed on the second surface of said circuit board.

7. The liquid crystal display device of claim 1 wherein said plurality of input terminals of said circuit board are formed along an edge of said circuit board.

8. The liquid crystal display device of claim 7 wherein said plurality of input terminals of said circuit board are formed in a form of a plurality of half-cut through holes.

9. The liquid crystal display device of claim 1,
   wherein said circuit board comprises a connection member extended from said circuit board for directly inserting into a receptacle of a main device unit; and
   wherein said plurality of input terminals of said circuit board comprises a plurality of input terminals disposed on a surface of said connection member.

10. A mounting structure for a liquid crystal display device, comprising:
    a main unit having a plurality of output terminals for supplying power supply and input signals;
    a liquid crystal display device mounted in said main unit, comprising:
       a liquid crystal cell containing a liquid crystal and having a plurality of input terminals,
       a circuit board directly connected to said liquid crystal cell and having a plurality of input terminals and a plurality of output terminals, said plurality of output terminals being electrically connected to said plurality of input terminals of said liquid crystal cell,
       drive means, mounted on said circuit board, for driving said liquid crystal, and at least one electronic component, mounted on said circuit board, for controlling said liquid crystal cell; and
    a conductive rubber connector coupling between said plurality of output terminals of said main unit and said plurality of input terminals of said circuit board for electrically connecting said main unit output terminals to said circuit board input terminals.

11. The liquid crystal display device mounting structure of claim 10,
    wherein said circuit board comprises a first surface and a second surface opposite to the first surface;
    wherein said drive means is mounted on the first surface of said circuit board; and
    wherein said plurality of input terminals of said circuit board are disposed on the second surface of said circuit board.

12. The mounting structure of claim 11, wherein said at least one electronic component is mounted on said second surface of said circuit board.

13. The mounting structure of claim 10, further comprising attachment means for securing said liquid crystal display device to said main unit such that said rubber connector is maintained in a compressed state between said circuit board and said main unit.

14. The mounting structure of claim 13 wherein said attachment means comprises a case housing said main unit.

15. An electronic device, comprising:
a main unit having a plurality of output terminals for supplying power supply and input signals;
display means, mounted in said main unit, for displaying information, said display means comprising a liquid crystal display device which comprises:
a liquid crystal cell containing a liquid crystal and having a plurality of input terminals,
a circuit board directly connected to said liquid crystal cell and having a plurality of input terminals for receiving said power supply and input signals and a plurality of output terminals, said plurality of output terminals being electrically connected to said plurality of input terminals of said liquid crystal cell,
drive means, mounted on said circuit board, for driving said liquid crystal, and
at least one electronic component, mounted on said circuit board, for controlling said liquid crystal cell.

16. The electronic device of claim 15, further comprising a flexible cable coupled between said plurality of input terminals of said circuit board and said plurality of output terminals of said main unit.

17. The electronic device of claim 15 wherein said plurality of input terminals of said circuit board and said plurality of output terminals of said main unit are coupled by soldering.

18. The electronic device of claim 15, further comprising an anisotropic conductive film coupled between said plurality of input terminals of said circuit board and said plurality of output terminals of said main unit.

19. The electronic device of claim 15,
wherein said main unit comprises a connector coupled to said plurality of output terminals of said main unit; and
wherein said plurality of input terminals of said circuit board are removably coupled to said connector of said main unit.

20. The electronic device of claim 15, further comprising a conductive rubber connector coupled between said plurality of input terminals of said circuit board and said plurality of output terminals of said main unit.

21. The electronic device of claim 20, further comprising attachment means for securing said liquid crystal display device to said main unit such that said rubber connector is maintained in a compressed state between said circuit board and said main unit.

22. The electronic device of claim 21, wherein said attachment means comprises a case housing said main unit.

23. The electronic device of claim 21,
wherein said circuit board comprises a first surface and a second surface opposite to the first surface;
wherein said plurality of output terminals of said circuit board are disposed on the first surface, and said plurality of input terminals of said circuit board are disposed on the second surface of said circuit board.

24. A liquid crystal display device, comprising:
a liquid crystal cell containing a liquid crystal and having a plurality of input terminals;
a circuit board directly connected to said liquid crystal cell and having a plurality of input terminals and a plurality of output terminals, said plurality of output terminals being electrically connected to said plurality of input terminals of said liquid crystal cell;
a semiconductor chip mounted on said circuit board, for driving said liquid crystal; and
at least one electronic component, mounted on said circuit board, for controlling said liquid crystal cell.

25. A mounting structure for a liquid crystal display device, comprising:
a main unit having a plurality of output terminals for supplying power supply and input signals;
a liquid crystal display device mounted in said main unit, comprising:
a liquid crystal cell containing a liquid crystal and having a plurality of input terminals,
a circuit board directly connected to said liquid crystal cell and having a plurality of input terminals and a plurality of output terminals, said plurality of output terminals being electrically connected to said plurality of input terminals of said liquid crystal cell,
a semiconductor chip mounted on said circuit board, for driving said liquid crystal, and
at least one electronic component, mounted on said circuit board, for controlling said liquid crystal cell; and
a conductive rubber connector coupling between said plurality of output terminals of said main unit and said plurality of input terminals of said circuit board for electrically connecting said main unit output terminals to said circuit board input terminals.

26. An electronic device, comprising:
a main unit having a plurality of output terminals for supplying power supply and input signals;
a display device, mounted in said main unit, for displaying information, said display device comprising a liquid crystal display device which comprises:
a liquid crystal cell containing a liquid crystal and having a plurality of input terminals,
a circuit board directly connected to said liquid crystal cell and having a plurality of input terminals for receiving said power supply and input signals and a plurality of output terminals, said plurality of output terminals being electrically connected to said plurality of input terminals of said liquid crystal cell,
a semiconductor chip, mounted on said circuit board, for driving said liquid crystal, and
at least one electronic component, mounted on said circuit board, for controlling said liquid crystal cell.

* * * * *